United States Patent [19]

Shields

[11] Patent Number: 4,934,464
[45] Date of Patent: Jun. 19, 1990

[54] SOD CUTTER

[76] Inventor: Robert L. Shields, P.O. Box 164, Miltona, Minn. 56354

[21] Appl. No.: 409,090

[22] Filed: Sep. 19, 1989

[51] Int. Cl.⁵ .............................................. A01B 1/24
[52] U.S. Cl. ...................................... 172/19; 172/377
[58] Field of Search ................... 172/13, 19, 20, 188, 172/371, 372, 376, 377, 387, 393; 30/DIG. 5

[56] References Cited

U.S. PATENT DOCUMENTS

| 161,048 | 3/1875 | McArdle | 172/19 |
|---|---|---|---|
| 944,859 | 12/1909 | Harris | 172/19 |
| 2,127,751 | 8/1938 | Picha | 172/393 X |
| 2,248,421 | 7/1941 | Bouton | 172/376 X |
| 2,506,371 | 5/1950 | Lint | 172/19 |
| 4,049,060 | 9/1977 | Hoke | 172/19 |
| 4,319,642 | 3/1982 | Merz | 172/13 |
| 4,539,765 | 9/1985 | Reece | 172/393 X |

FOREIGN PATENT DOCUMENTS 962346 6/1950 France ............................... 172/376

OTHER PUBLICATIONS

R. L. Gould & Co. Catalog 1988, pp. 63 and 97.

Primary Examiner—Randolph A. Reese
Assistant Examiner—Jeffrey L. Thompson
Attorney, Agent, or Firm—Burd, Bartz & Gutenkauf

[57] ABSTRACT

A tool for cutting elongated turf strips has a cutting head secured to lateral stabilizing members. The cutting head is a rectangular box-shaped member having forward peripheral cutting edges. The stabilizing members ride on the turf surface to ensure a uniform cutting depth of the cutting head. An upwardly and rearwardly directed handle is secured to the top wall of the cutting head to facilitate moving the cutting head through turf to cut a strip of sod therefrom.

14 Claims, 4 Drawing Sheets

SOD CUTTER

TECHNICAL FIELD

The invention relates to hand tools for cutting turf strips used to repair lawns, golf course fairways and greens, and like turf. The tools are hand-operated implements that cut sod into strips that are planted to repair turf.

BACKGROUND OF INVENTION

Often it is necessary to cut strips of sod from a damaged area of turf for replacement with sod strips from a turf nursery. Turf repair is a common golf course maintenance procedure. Sod cutters have been used in the past to cut strips of sod from nursery sod for replacing damaged turf areas. For example, a sod cutter having a one-piece frame accommodating a downwardly directed adjustable cutting blade is marketed by the R. L. Gould & Co. This sod cutter has a roller rotatably mounted on the forward portion of the frame. A pair of upwardly and rearwardly directed handles are secured to the frame. The cutter is used to cut sod into conventional 12-inch or 18-inch strips. Frequently, more sod is cut than is necessary for repair. The width of the cut is not adjustable. Further, a downward force cannot be applied on the cutter when a cut is being made because both hands of the operator are required to be used to push the tool forwardly through the turf. This is likely to result in cut depths being uneven.

SUMMARY OF INVENTION

The invention is a tool for cutting strips of sod used to repair damaged areas of turf. The turf strips are planted in an elongated trench that is left and a damaged sod strip is removed from an area of turf.

The tool has a cutting head secured to lateral stabilizers and an elongated handle. The cutter head has forward peripheral cutting edges. The lateral stabilizers determine the depth of cut of the cutter head. The handle is attached to the cutter head to facilitate manual movement of the cutter head through the turf to cut a strip of sod therefrom.

One form of the sod cutter of the invention has a cutter head for cutting an elongated strip of sod from turf. A handle attached to the cutter head is used to manually move the cutter head along the turf to cut the sod. The cutter head has front cutting knife edges for cutting the sides and bottom of the sod. The cutting edges include downwardly and rearwardly inclined side knife edges and a transverse bottom cutting knife edge for separating the sides of a sod strip and the bottom thereof during movement of the cutter head along the surface of the turf. The stabilizers for the cutter head comprise outwardly projected lateral arms secured to the cutter head and horizontal sleds that ride on the turf. The vertical location of the sleds relative to the bottom cutting knife determines the cutting depth of the cutter head and maintains the cut depth during cutting of a sod strip from the turf.

Another form of the sod cutter of the invention has a cutter head with front cutting knife edges to cut the sides and bottom of a strip of sod from turf. A handle is pivotally connected to the cutter head to allow the cutter to follow the turf terrain. The depth of the cut of the cutter head and stability thereof is controlled with roller assemblies connected with arms attached to the cutter head. The arms are laterally adjustable to vary the location of the roller assemblies relative to opposite sides of the cutter head.

DESCRIPTION OF PREFERRED EMBODIMENTS

Figure 1:
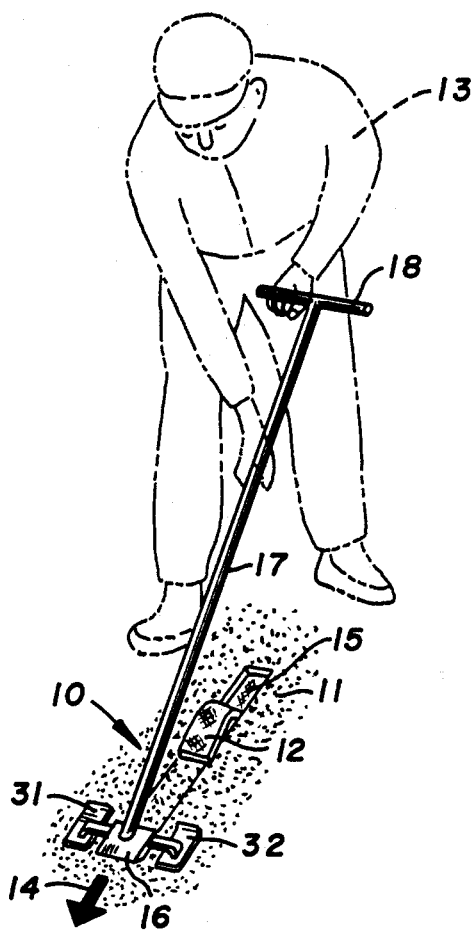
FIG. 1 is a perspective view of the sod cutter of the invention illustrating its use to cut a strip of sod.

Referring to FIGS. 1 to 8, there is shown a turf repair tool or sod cutter indicated generally at 10 for repairing a damaged area of turf or sod 11 of a golf course green. Cutter 10 is used to cut an elongated sod strip 12 of sod that has been damaged. The damaged sod strip is removed, leaving an elongated trench 15. A replacement sod strip is placed in trench 15 to complete the repair of the golf course green. Sod cutter 10 is manually manipulated by person 13 and moved into the direction of the arrow 14 over sod 11 to cut an elongated sod strip 12 to remove the damaged portion of the turf. A replacement sod strip from nursery sod or other sod having the same width and length as sod strip 12 is cut with tool 10 and planted in trench 15. The replacement sod strip is not cut or trimmed to fit into trench 15 thereby reducing time and labor to repair the turf. In addition, the replacement sod strip remains firm which facilitates growth of the sod in trench 15.

Figure 2:
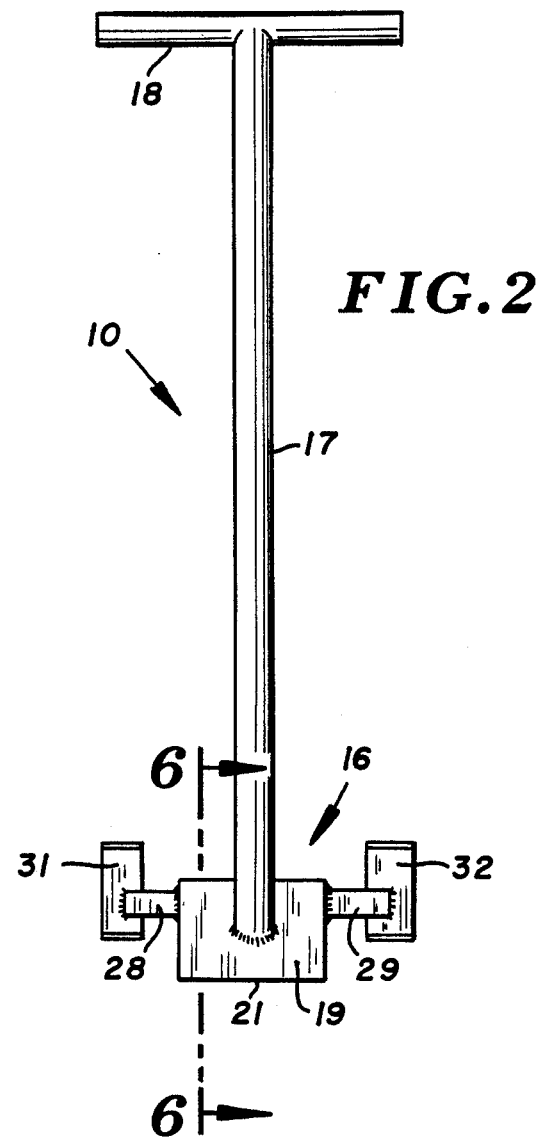
FIG. 2 is an enlarged top view of the sod cutter of FIG. 1.
Figure 4:
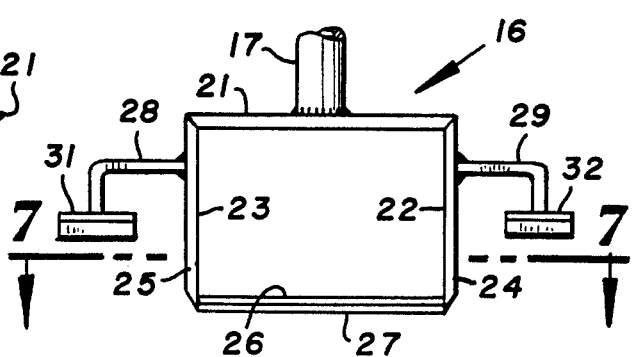
FIG. 4 is an enlarged foreshortened front view of the sod cutter.
Figure 5:
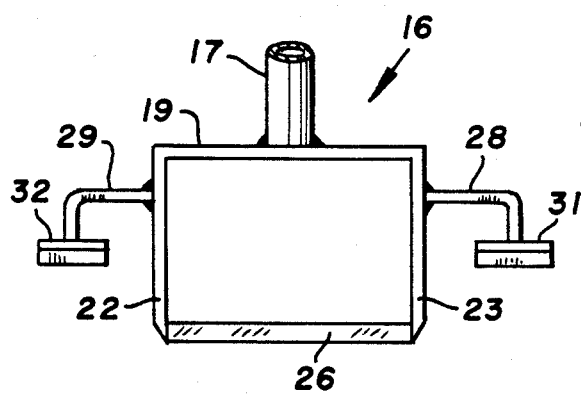
FIG. 5 is an enlarged foreshortened rear view of the sod cutter.
Figure 6:
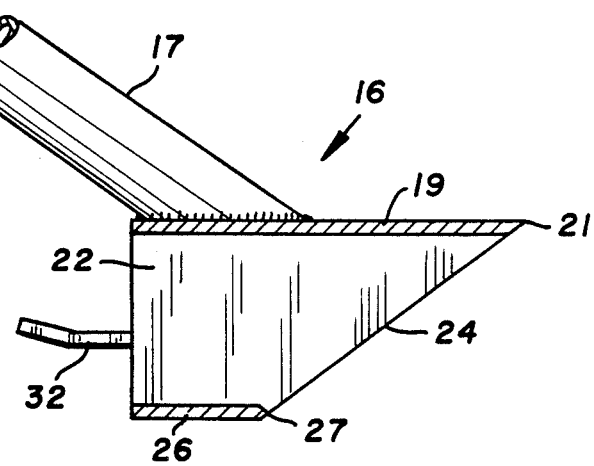
FIG. 6 is an enlarged sectional view taken along the line 6—6 of FIG. 2.
Figure 7:
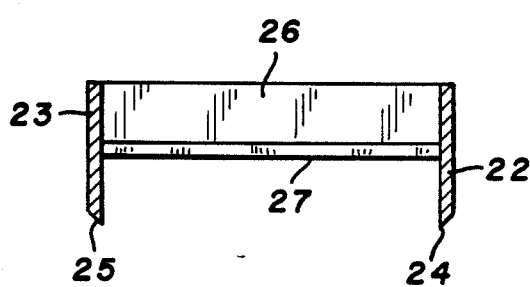
FIG. 7 is an enlarged sectional view taken along line 7—7 of FIG. 4.

Referring to FIG. 2, sod cutter 10 has a cutter head, indicated generally at 16, secured to an upwardly and rearwardly directed handle 17. Handle 17 is an elongated, linear, rigid member of metal, plastic or wood having an outer end attached to a cross bar 18 to facilitate manual use of tool 10. The forward end of handle 17 is secured to a center portion of a top wall 19 of cutter head 16. Top wall 19 has a transverse front knife edge 21 used to cut transverse edges in the sod at the beginning and end of sod strip 12. As shown in FIGS. 4 to 8, downwardly directed side walls 22 and 23 are secured to opposite sides of top wall 19. Side walls 22 and 23 have downwardly and rearwardly inclined front knife edges 24 and 25 that extend to the forward edge of a bottom wall 26. Bottom wall 26 is a cutting blade having a front transverse knife edge 27, as seen in FIGS. 4, 6 and 7. Top wall 19, side walls 22 and 23, and bottom wall 26 are secured together to form a generally rectangular box having forward peripheral cutting edges. The lateral distance between side walls 22 and 23 determines the width of the cut sod strip. This distance can vary to provide different sizes of cutting heads. For example, cutter head 16 can have transverse dimensions of three, five, or seven inches to provide different widths of sod strips.

Figure 8:
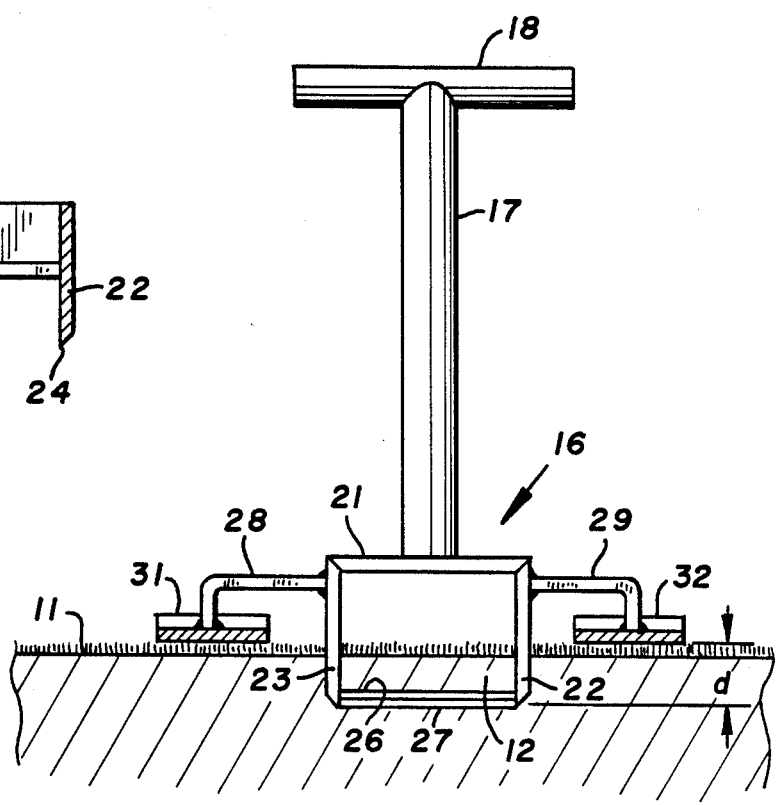
FIG. 8 is a front elevational view of the sod cutter in the sod cutting position.

Lateral stability of sod cutter 10 is achieved with the outriggers or stabilizers comprising a pair of oppositely extending arms 28 and 29 secured to side walls 22 and 23. Arms 28 and 29 have downwardly directed outer portions secured to slides or sleds 31 and 32 respectively. Sleds 31 and 32 are flat metal plates that extend in a generally horizontal direction and have slightly upwardly directed forward and rear ends to avoid digging into sod 11 during movement of tool 10 to cut a sod strip as shown in FIG. 1. Sleds 31 and 32 are located in a horizontal plane that is above the horizontal plane of bottom wall 26 to provide gauges or stops for determining the depth d of cut of bottom wall 26 of cutter 10. Depth d of cut can be ¾ to 1 inch. Other cut depths can be used. Sleds 31 and 32 slide on top of sod 11, as shown in FIG. 8, during the cutting procedure to maintain the cut depth d.

Figure 3:
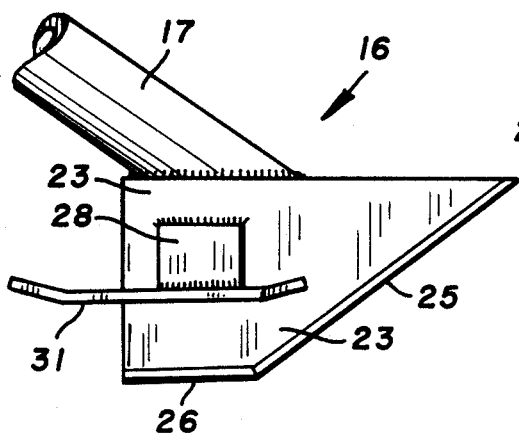
FIG. 3 is an enlarged foreshortened side view of the sod cutter.

As seen in FIGS. 2 and 3, sleds 31 and 32 are positioned behind the transverse plane of the cutting edges 21, 24, 25, and 27. Rear sections of sheds 31 and 32 project rearwardly from the back of cutter head 16 to provide longitudinal stability to tool 10 during the sod strip cutting operation.

Referring to FIGS. 9 to 12, there is shown a modification of the sod cutter of the invention, indicated generally at 100, for cutting a strip of sod from turf 111. Sod cutter 100 has a cutter head 116 pivotally connected to an upwardly and rearwardly directed handle 117. The upper end of handle 117 has a cross bar 118 to facilitate the manual gripping of the handle.

Cutter head 116 has a generally flat top wall 119 having a front transverse knife edge 121 for transversely cutting a strip of sod. Downwardly directed side walls 122 and 123 are joined to opposite sides of top wall 119. Side walls 122 and 123 have downwardly and rearwardly inclined front knife edges 124 and 125 that terminate at a bottom wall 126. Bottom wall 126 is a cutting blade that has a front transverse knife edge 127. Top wall 119, sides walls 122 and 123, and bottom wall 126 form a generally rectangular box structure that cuts the sides and bottom of a sod strip as cutter head 116 is moved forward through sod 111.

Figure 9:
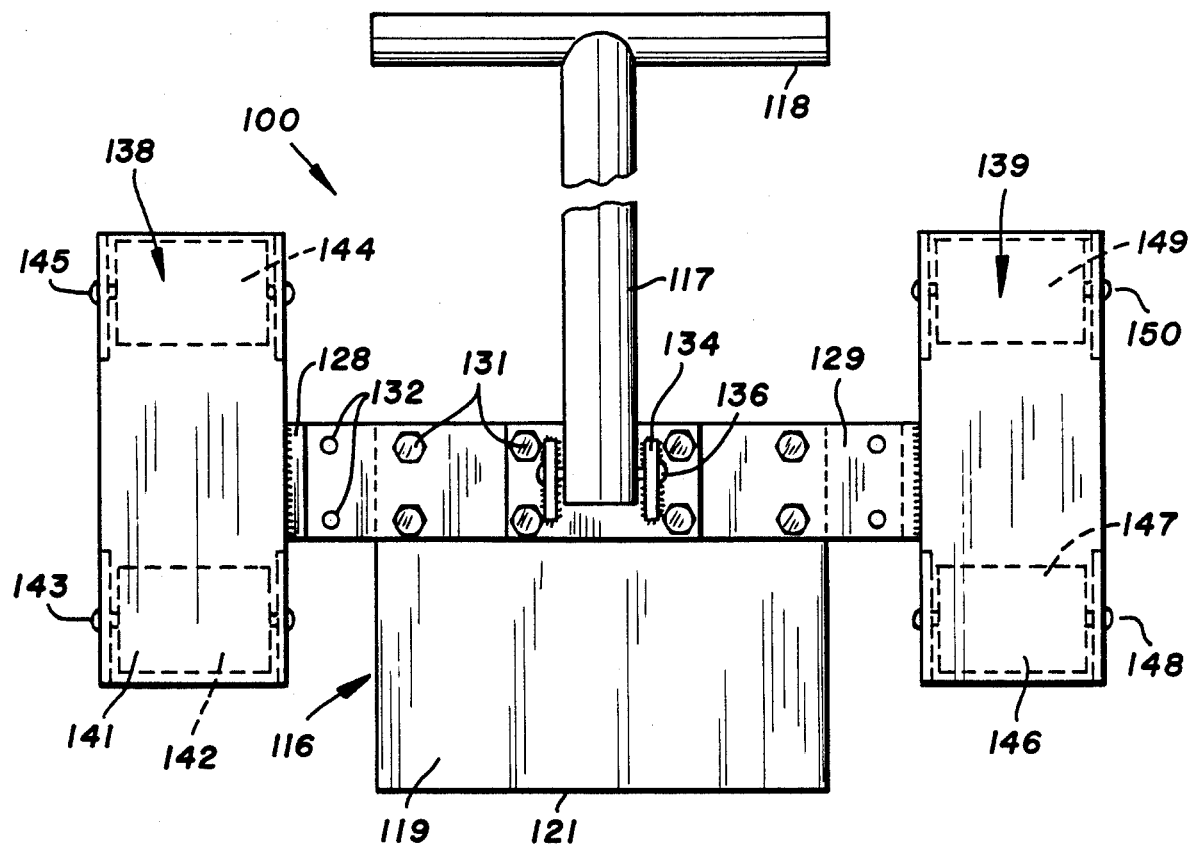
FIG. 9 is an enlarged foreshortened top view of a modification of the sod cutter of the invention.
Figure 10:
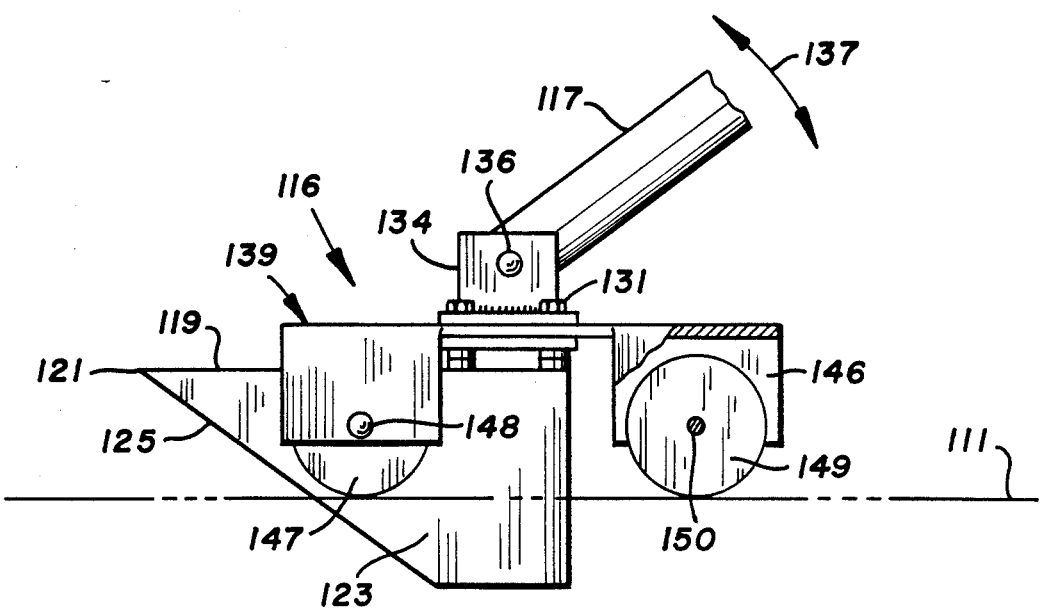
FIG. 10 is a side elevational view, partly sectioned, of the sod cutter of FIG. 9.
Figure 11:
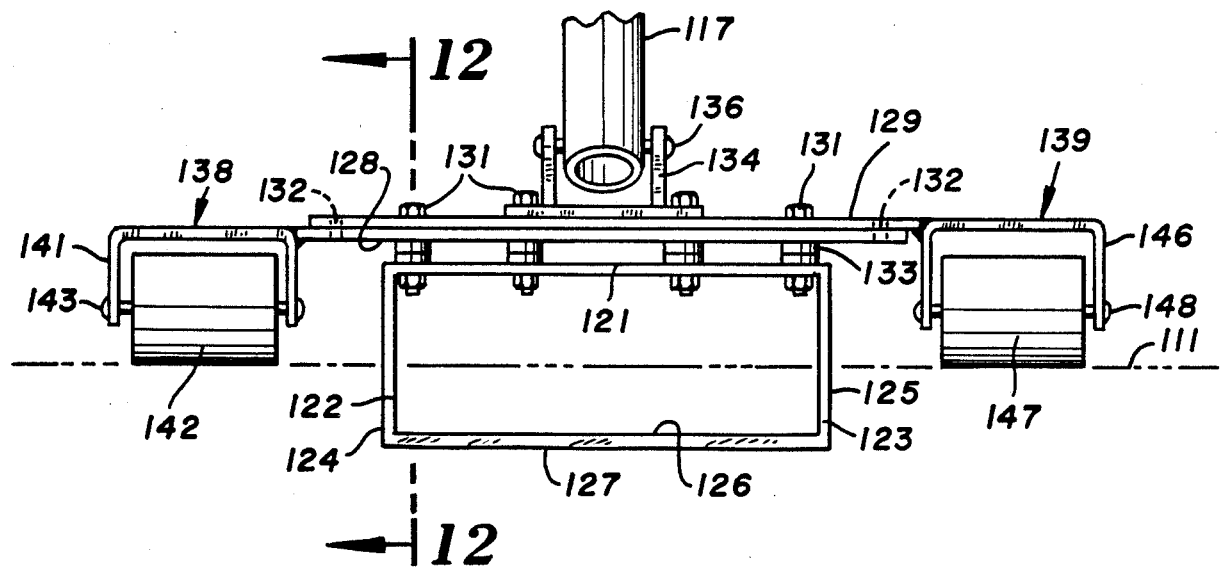
FIG. 11 is a front elevational view of the sod cutter of FIG. 9.
Figure 12:
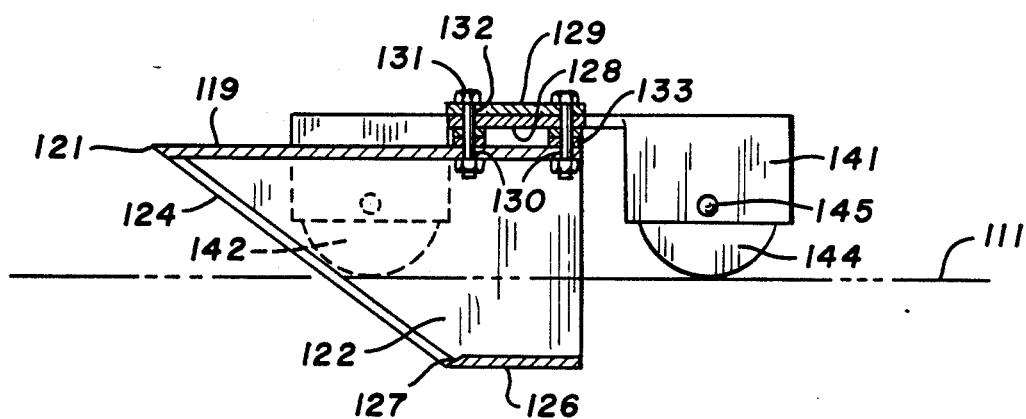
FIG. 12 is an enlarged sectional view taken along the line 12—12 of FIG. 11.

A pair of oppositely directed transverse arms 128 and 129 are located above the rear portion of top wall 119 as seen in FIGS. 9, 11, and 12. A plurality of nut and bolt assemblies 131 project through holes 132 in arms 128 and 129 and holes 130 in top wall 119 to secure arms 128 and 129 to top wall 119. Spacers 133 comprising a plurality of washers are interposed between the arm 128 and top wall 119 to adjust the depth of cut of bottom wall 126. The greater the number of spacers between arm 128 and top wall 119, the deeper the cut into sod 111 as hereinafter described.

Returning to FIGS. 9 and 11, a generally upwardly directed yolk 134 is secured with nut and bolt assemblies 131 to the midportion of overlapping arms 128 and 129. A transverse pivot pin 136 extends through yolk 134 and the lower end of handle 117 to pivotally connect the handle to the cutting head. The handle 117 can pivot about a generally transverse axis, allowing the cutter head 116 to freely float on the surface of sod 111. The pivotal motion of the handle 117 relative to cutter head 116 is shown by arrow 137 in FIG. 10.

Tandem roller assemblies indicated generally at 138 and 139 secured to outer ends of arms 128 and 129 by welds or the like provide lateral and longitudinal stability to cutter head 116 during the sod strip cutting operation. The first tandem wheel assembly 138 has a generally inverted channel or U-shaped member 141 that projects rearwardly of top wall 119. Channel 141 rotatably supports a pair of rollers 142 and 144. Axles 143 and 145 rotatably mount rollers 142 and 144 on opposite end portions of the side walls of channel 141. A second inverted channel or U-shaped member 146 is secured to outer end of arm 129. A pair of rollers 147 and 149 are rotatably mounted on opposite ends of channel 146 with transverse axles 148 and 150, respectively. Axles 148 and 150 extend through holes in downwardly directed side wall portions of channel 146. Each channel 141 and 146 has two pairs of downwardly directed sides accommodating axles 143, 145, 148 and 150 for rollers 142, 144, 147 and 149.

Sod cutters 10 and 100 are used to repair damaged portions of turf, such as the fine turf on a golf course green. The turf could be damaged by mowing machinery, winter weather, vandalism, or grass disease. Sod cutters 10 and 100 are used to cut damaged strips of sod which are removed from the turf and replaced with turf nursery. The front downwardly inclined knife edges 24, 25, 124 and 125 and the transverse bottom forward knife edges 27 and 127 cut clean the vertical and horizontal surfaces of the soil and turf at a selected depth. Sleds 31 and 32 serve as guides to permit a uniform depth of cut of the sod. The tandem roller assemblies 138 and 139 roll on the surface of sod 111 and determine the depth of cut of the side walls 122 and 123 and bottom wall 126 of sod cutter 100. This cut depth can be adjusted by changing the number and/or length of spacers 133 between arms 128 and 129 and top wall 119.

The cutter head 116 can be replaced with a cutting head (not shown) having a transverse dimension greater than the transverse dimension of cutting head 116 to provide a wider sod strip. For example, cutter head 116 can have transverse dimensions of three, five, or seven inches to provide different widths of sod strips. Arms 128 and 129 can be laterally adjusted in opposite outward directions by changing the positions of the nut and bolt assemblies 131 relative to holes 132 in arms 128 and 129.

While there has been shown and described preferred embodiments of the sod cutter of the invention, it is understood that changes in the structures, arrangements of structures, can be made by those skilled in the art without departing from the invention. The invention is defined in the following claims.

I claim:

1. A tool for cutting a strip of sod from turf comprising: a cutting head for cutting a strip of sod from turf, said cutting head comprises a generally rectangular box having a top wall, said top wall having opposite ends and a transverse front cutting edge for transversely cutting a strip of sod, bottom wall having opposite ends and a transverse front cutting edge for undercutting a strip of sod, and a pair of downwardly directed side walls secured to said opposite ends of the top and bottom walls, said side walls each having a downwardly and rearwardly inclined front cutting edge that extends from the transverse front cutting edge on the top wall to the transverse front cutting edge on the bottom wall, means secured to the cutting head to laterally stabilize the cutting head and to determine the depth of cut of the cutting head, and handle means attached to the cutting head to facilitate manual movement of the cutting head through the turf to cut a strip of sod therefrom.

2. The tool of claim 1 wherein: the means secured to the cutting head comprises a pair of oppositely extending arms secured to opposite sides of the cutting head, each arm having a downwardly directed outer portion, sled means attached to each outer portion whereby when the cutting head is moved through the turf the sled means engage separate surface areas of the turf.

3. The tool of claim 2 wherein: the sled means has upwardly directed forward and rear ends to prevent the ends from digging into the turf.

4. The tool of claim 2 wherein: the sled means is located in a horizontal plane that is above a horizontal plane occupied by the transverse front cutting edge on the bottom wall to determine the depth of cut of the cutting head.

5. The tool of claim 1 wherein: the means secured to the cutting head comprises a pair of oppositely extending overlapping arms, fastening means extending through the arms and the cutting head to secure the arms to the cutting head, each arm having an outer end, roller means attached to each outer end whereby when the cutting head is moved through the turf the roller means engage the surface of the turf.

6. The tool of claim 5 including: spacer means mounted between the arms and the cutting head to adjust the depth of cut of the cutting head.

7. The tool of claim 5 wherein: the arms have means allowing lateral adjustment of the arms in opposite outward directions.

8. The tool of claim 5 wherein: each roller means comprises a generally inverted U-shaped channel, and a pair of rollers rotatably mounted on opposite ends of the channel.

9. The tool of claim 1 wherein: the handle means comprises an elongated rigid member having an outer end attached to a cross bar.

10. The tool of claim 9 wherein: the shaft has a lower end pivotally mounted on the cutting head whereby the shaft is pivotable about a generally transverse axis.

11. A tool for cutting a strip of sod from turf comprising: a cutting head for cutting a strip of sod from turf, the cutting head comprising a generally rectangular box having a top wall, bottom wall, and a pair of downwardly directed side walls secured to opposite ends of the top wall and the bottom wall, said top wall having a transverse front cutting edge for transversely cutting a strip of sod, the bottom wall having a transverse front cutting edge for undercutting a strip of sod, the side walls each having a downwardly and rearwardly inclined front cutting edge extending to the transverse front cutting edge of the bottom wall, a pair of oppositely extending arms secured to the opposite side walls of the cutting head, each arm having a downwardly directed outer portion, sled means connected to said outer portions to laterally stabilize the cutting head and to determine the depth of cut of the cutting head, and handle means attached to the top wall of the cutting head to facilitate manual movement of the cutting head through the turf to cut a strip of sod therefrom.

12. The tool of claim 11 wherein: each sled means comprises a generally flat rectangular member having upwardly directed front and rear ends.

13. The tool of claim 11 wherein: each sled means is located in a horizontal plane that is above a horizontal plane of the bottom wall of the cutting head for determining the depth of cut of the cutting head.

14. The tool of claim 11 wherein: the handle means comprises an upwardly and rearwardly directed member having an outer end and a transverse bar attached to said outer end.

* * * * *